Oct. 9, 1923.
E. V. STONE
VEHICLE WHEEL
Filed Aug. 19, 1922
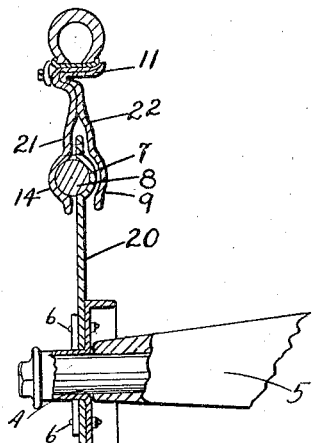
Fig 1.
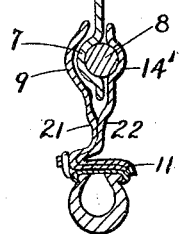
Fig 2.
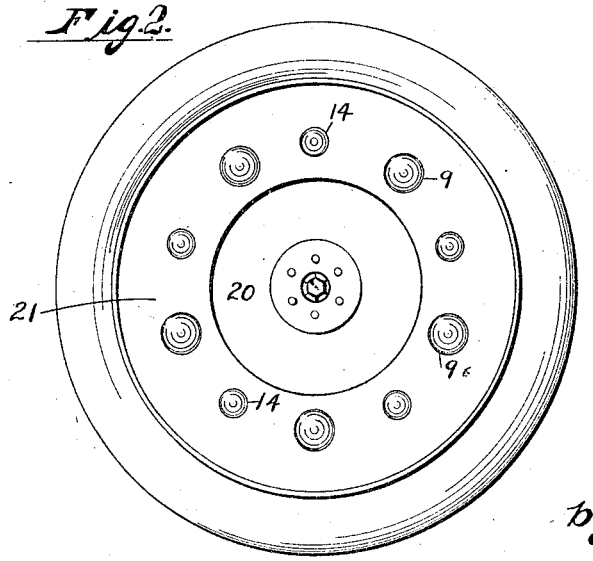
INVENTOR
Ernest V. Stone.
by Hazard & Miller
ATT'YS.

Patented Oct. 9, 1923.

1,470,496

UNITED STATES PATENT OFFICE.

ERNEST VICTOR STONE, OF TAFT, CALIFORNIA.

VEHICLE WHEEL.

Application filed August 19, 1922. Serial No. 582,980.

*To all whom it may concern:*

Be it known that I, ERNEST VICTOR STONE, a citizen of the United States, residing at Taft, in the county of Kern and State of California, have invented new and useful Improvements in Vehicle Wheels, of which the following is a specification.

This invention relates to vehicle wheels and has for its object to provide a substantial, inexpensive, durable and simple form of resilient wheel. Another object is to provide a resilient wheel consisting of complementary spaced and connected central discs and an inwardly flanged rim member between which discs and flange are provided cushioning means, preferably of deformable material such as rubber bodies.

Another object of the invention is to provide a resilient wheel, the principal elements of which may be associated in such manner as to provide relative oscillation as between the hub of the wheel and the rim carrier, and which parts are associated by deformable elements rendering the wheel serviceable with or without pneumatic tires.

Other objects and advantages will be made manifest in the following specification of an embodiment of the invention illustrated in the accompanying drawings, in which—

Fig. 1 is a transverse section showing a form of the wheel.

Fig. 2 is a side elevation thereof.

The invention broadly consists of a wheel comprising a pair of outer flanges and a disc centrally, securely attached to a hub device 4 mounted on any appropriate axle structure 5, as by means of hub bolts 6 for a purpose hereinafter described.

It has been found from actual use that the device is capable of successfully operating under usual high speed automobile service and has the load carrying capacity of the usual wheel structures.

In Figures 1 and 2 a variant of the invention is shown in which a single central disc 20 is provided with concavo-convex pockets 7 arranged in a common circle, one of the series of the pockets extending convexly from one side of the disc and an alternate series of pockets extending convexly from the opposite side of the disc, thus providing one circle of pockets to receive the cushioning members or rubber balls 8. These balls are thus presented in alternate exposed relation on opposite sides of the wheel and are embraced by a double flanged rim structure. This rim structure has an outer flange 21 with a series of pockets 14 to receive contiguous balls 8.

Opposed to the flange 21 is an inner flange 22 likewise provided with a series of pockets 14' to receive the contiguous series of balls 8. The flanges 21 and 22 are rigidly secured at their outer portions and are provided with a rim receiving felly 11. The flanges are also provided with concavities 9 to provide clearance for the protuberant portions of the pockets of the disc 20.

The concavo-convex portions 7 substantially form embossments in the plate; as also do the portions 9 and 14.

What is claimed is:

1. A resilient wheel consisting of a central section mounted on a hub and having around its margin a circle of pockets which are alternately formed on opposite sides of the central section, a rim structure having inwardly extending spaced flanges between which the marginal portion of the central section is received and plays, said flanges each having inwardly facing pockets to register with contiguous pockets in the central section, and deformable ball cushions compressed between the registered pockets of said flanges and said section.

2. A resilient wheel consisting of a central section mounted on a hub and having around its margin a circle of pockets which are alternately formed on opposite sides of the central section, a rim structure having inwardly extending spaced flanges between which the marginal portion of the central section is received and plays, said flanges each having embossments with inwardly facing pockets to register with contiguous pockets in the central section, and elastic deformable balls compressed between the registered pockets of said flanges and said section, said flanges having concavities to clear contiguous convex faces of said embossments of the said central section.

3. A resilient wheel consisting of a central section mounted on a hub and having around its margin a circle of concavo-convex protuberances forming pockets which are alternately formed on opposite sides of the central section, a rim structure having inwardly extending spaced flanges between which the marginal portion of the central section is received and plays, said flanges each having inwardly facing pockets to register with contiguous pockets in the central section, and cushioning means compressed between the registered pockets of said flanges and said section.

In testimony whereof I have signed my name to this specification.

ERNEST VICTOR STONE.